United States Patent [19]

Sanduja et al.

[11] Patent Number: 5,763,557
[45] Date of Patent: *Jun. 9, 1998

[54] GRAFTING OF A POLYMER ONTO CELLOPHANE BY ULTRASONIC INDUCED FREE RADICAL POLYMERIZATION

[75] Inventors: Mohan L. Sanduja, Flushing; Carl Horowitz, Brooklyn; Paul Thottathil, New Hyde Park, all of N.Y.

[73] Assignee: Polymer Research Corp. of America, Brooklyn, N.Y.

[*] Notice: The term of this patent shall not extend beyond the expiration date of Pat. No. 5,342,659.

[21] Appl. No.: 718,725

[22] Filed: Sep. 24, 1996

[51] Int. Cl.$^6$ ........................................ B05D 3/06
[52] U.S. Cl. .................... 527/100; 527/101; 527/102; 527/103; 527/200; 527/201; 527/207; 527/300; 527/311; 527/312; 527/313; 527/314; 527/315; 527/400; 523/200; 523/205; 523/207; 523/300; 427/487; 427/656; 427/601
[58] Field of Search ...................... 527/100, 101, 527/102, 103, 200, 201, 207, 300, 311, 312, 313, 314, 315, 400; 523/200, 205, 207, 300; 427/457, 487, 532, 565, 600, 601, 553, 302, 303, 399, 554, 322

[56] References Cited

U.S. PATENT DOCUMENTS

| 5,232,748 | 8/1993 | Horowitz et al. | 427/553 |
| 5,342,659 | 8/1994 | Horowitz et al. | 427/553 |

*Primary Examiner*—Nathan M. Nutter
*Attorney, Agent, or Firm*—Steinberg, Raskin & Davidson, P.C.

[57] ABSTRACT

The invention relates to the chemical bonding of a polymer/ or polymers onto non-metallic substrates such as cellophane by ultrasonic techniques. The cellophane film is preactivated by contacting with silver nitrate solution followed by treatment with potassium hydroxide solution whereby particles of silver and silver oxide are uniformly distributed, in situ, over the surface of cellophane film. The pretreated cellophane film when contacted with grafting solution, that contains monomers, prepolymers, catalyst, graft initiator and other ingredients of the composition, which is being agitated with ultrasonic energy results in polymerization of monomer/prepolymer onto the surface of the cellophane film.

7 Claims, No Drawings

GRAFTING OF A POLYMER ONTO CELLOPHANE BY ULTRASONIC INDUCED FREE RADICAL POLYMERIZATION

BACKGROUND OF THE INVENTION

Polymers have been grafted onto non-metallic substrate surfaces, such as cellophane, for example as described in U.S. Pat. No. 3,401,049. The basic of grafting of the polymer comprises the contacting of the non-metallic body with a solution of silver nitrate and an alkali-metal hydroxide, then contacting a polymerizable monomer and a catalyst, the polymerization taking place directly on the molecules of the substrate.

In more recent processing, the grafting of the polymer onto the substrate has utilized variation, chrona discharge, UV treatment and thermo treatment to accelerate the polymerization and cure the polymer. The processing is in general the same, namely the activated surface of the substrate is brought into contact with a drafting solution which contains the monomers, prepolymers, catalyst and graft initiator systems, and the resulting graft treated surface is then subjected to cure as set forth above.

Polymerization has also been accomplished using ultrasonic energy as reported by P. Kruss, et al. in J. Phys. Chem. CB, 91, 3041, 1987. Polymerization has also been accomplished using a chemical initiator that breaks down to form a free radical which in turn starts the polymerization process.

However, all of the methods are either too hazardous, such as grafting by means of radiation, or too time and energy consuming, such as grafting UV. There thus has arisen a need for a more rapid yet safe method of grafting polymers onto substrates.

SUMMARY OF THE INVENTION

Generally speaking in accordance with the present invention, polymers are grafted onto substrates using ultrasonic induced free radical polymerization. The surface of the substrate such as a cellophane film is activated by treatment with an aqueous silver nitrate solution followed by treatment in a solution of alkali metal hydroxide. The preactivation may also be accomplished by immersing the cellophane film in a reaction mixture obtained by the addition of alkali metal hydroxide to an aqueous silver nitrate solution. The alkali metal hydroxide being added in an amount just sufficient to achieve a permanent slight cloudiness. The pretreated cellophane surface is then treated by dipping into a monomer catalyst solution which is being agitated by ultrasonic energy waves and this is then followed by curing the treated film.

It is accordingly a primary object of the present invention to provide methods of accelerating the polymerization of polymerizable monomers or prepolymers onto non-metallic substrates, such as cellophane.

It is yet a further object of the present invention to accelerate the polymerization onto treated substrates by ultrasonic energy waves.

Other objects and advantages of the present invention will be apparent from a further reading of the specification and of the appended claims.

DETAILED DESCRIPTION OF THE INVENTION

The present invention is applicable to grafting of polymers onto a wide variety of non-metallic materials such as cellophane, cotton fibers and fabrics, rayon fibers and fabrics, wood, nylon fibers, fabrics and films, fibers, fabrics, and other films, polyethylene glycol adipate films, cellulose dry acetate fibers, polyolefin fibers and fabrics, natural and synthetic rubbers, leather, wool, and the like.

For purposes of simplicity, the invention will be in generally with respect to the treatment of cellophane as the substrate.

The invention is applicable to the use of any polymerizable monomer or prepolymer such as vinylidene chloride, isoprene, dimethylaminoethyl methacrylate, styrene, acrylonitrile, acrylamide, N-vinylpyridine, acrylic acid, methacrylic acid, ethyl acrylate, and the like.

According to the general method is provided grafting a polymerizable monomer onto a non-metallic substrate, such as cellophane, which comprises activating the substrate by contacting the substrate with a solution of silver nitrate and precipitating silver oxide or colloidal silver therefrom by means of an alkali hydroxide, contacting the thus activated substrate with a polymerizable composition including a catalyst and being adapted to be activated to polymerization by the silver oxide or colloidal silver so as to cause polymerization at sites thereof on the substance to bind the resulting polymer directly to the substrate, and curing the resulting polymer to effect intimate binding to the substrate, the improvement which comprises effecting grafting of polymers onto activated substrates using free radical polymerization induced by ultrasonic techniques.

The methods provided comprise curing which is effected by air drying the substrate followed by curing the substrate at about 220° F. for about 1–2 minutes.

The method is applicable to substrates including cellophane, cotton, rayon, wood nylon, polyester, polyethylene glycol, adipate, cellulose triacetate, polyethylene, natural and synthetic rubbers, leather or wool. The method provided accomplishes grafting of polymers onto the substrate using free radical polymerization induced by using ultrasonic techniques.

The cellophane film is pretreated/preactivated as indicated by the following general procedure:

1. The film is washed with deioinized water at ambient temperature for about one minute.

2. The washed film is dipped in a 1% silver nitrate solution at room temperature for one minute.

3. This is followed by rinsing the film with water for about 10 to about 15 seconds.

4. This film is then soaked in about a 1% potassium hydroxide solution maintained at about 80° C. for about one minute.

5. This cellophane film is then rinsed with water and dried.

The monomer/prepolymer solution is prepared by taking a desired amount of water, (or solvent) as the case may be, and to it is added a precalculated quantity of monomer(s), prepolymer(s), catalyst, graft initiator and other ingredients. The contents of the solution are stirred to form a uniform solution.

The monomer/prepolymer solution prepared above is then grafted onto the cellophane film, from above, using an ultrasonic cell such as Vibra Cell X-600 which is a high intensity ultrasonic liquid processor.

Ultrasonic induced polymerization of the monomers/prepolymers is carried out using a high intensity ultrasonic Vibra Cell X-600. The cell comprises a ultrasonic power supply (generator) which converts 50/60 Hz voltage to high frequency 20 Khz (20,000 cycles per second) electrical energy which is transmitted to the piezolelectric transducer within the converter, where it is changed to mechanical vibrators. The vibrations from the converter are intensified by the probe (horn), creating pressure waves in the liquid. This action forms millions of microscopic bubbles (cavities) which expand during the negative pressure excursion and implore violently during the positive excursion. It is this phenomena, referred to as activation rather referred as cavitation which produces the powerful shearing action at the probe dip and causes the molecules in the liquid to become intensely agitated.

Grafting of Monomer/Prepolymer onto Cellophane

The pretreated cellophane film was prepared in accordance with the general procedure outlined above. The dry preheated film was immersed in graft solution contained in a container which in turn was fitted into an ultrasonic probe. The ultrasonic energy waves were turned on until the temperature of the solution was maintained to 70° C. This cellophane film was then subjected to these high intensity ultrasonic energy waves for 30 seconds at 70° C. The film was removed, air dried and then subjected to cure at 220° F. for 1–2 minutes. The grafted cellophane films thus prepared were tested for various characteristics.

DESCRIPTION OF PREFERRED EMBODIMENTS

The following examples are given to further illustrate the invention. The scope of the invention is not, however, meant to be limited to the specific details of the examples.

The following is a general description of the method:

Graft coating compositions are prepared and each one is applied onto preactivated cellophane film by immersing the cellophane film in a grafting solution contained in a container which in turn was fitted into a ultrasonic probe. The ultrasonic energy waves were turned on until the temperature of the solution was maintained to about 70° C. The pretreated cellophane film was subjected to these high intensity ultrasonic energy waves for about 30 seconds at 70° C., the film was then removed, air dried and subjected to cure at 220° F. for about 1–2 minutes.

The following are the steps involved in the grafting of cellophane film:

I. Pretreatment of Cellophane Film

The cellophane film is pretreated (preactivated in accordance with the following procedure:

1. Wash the film with deionized water at ambient temperature for one minute.

2. Dip the washed film in 1% silver nitrate solution at room temperature for one minute.

3. The step 2 is followed by rinsing the film with water for 10–15 seconds.

4. The film obtained after step 3 is soaked in 1% potassium hydroxide solution maintained at 80° C. for one minute.

5. Rinse the film in water and subject to air dry.

II. Preparation of Monomers/Prepolymer Solution

A desired amount of water (or solvent) as the case may be, is taken into a container and to it is added a precalculated quantity of monomers, prepolymers, catalyst, graft initiator and other ingredients of the solution. The contents are stirred to a uniform solution.

III. Drafting of Monomer/Prepolymer Solution (Prepared in Step II.) onto Cellophane Film Using Ultrasonic Vibra Cell X-600—a High Intensity Liquid Processor The pretreated cellophane film (8 inches×11 inches) was prepared by pretreating with the graft activating solution in accordance with the steps indicated in I. above. The dry pretreated film was immersed in grafting solution contained in a container which in turn was fitted into an ultrasonic probe. The ultrasonic energy wave were turned on until the temperature of the solution was maintained to 70° C. The cellophane film was then subjected to these high intensity ultrasonic energy waves for about 30 seconds at 70° C. The film was removed, air dried and then subjected to cure at 220° F. for about 1–2 minutes. The grafted cellophane films thus prepared were then tested for various characteristics.

EXAMPLE I

I. Preactivating Solution

Solution A—Wash with plain water at room temperature for one minute.

Solution B—Dip in 1.0% silver nitrate solution at room temperature for one minute.

Solution C—Rinse in water at room temperature for 10 seconds.

Solution D—Dip in 1% potassium hydroxide solution at 80° C. for one minute.

Solution E—Wash in plain water and dry in air.

| II. Grafting Solution: | |
| --- | --- |
| | Parts by Weight |
| Water | 100.00 |
| Dimethyl formamide | 20.00 |
| Hydroxy ethyl Methacrylate | 8.00 |
| Arcylonitrile | 2.00 |
| Ammonium Persulfate | 1.00 |
| Sodium Metabisulfite | 1.00 |

Preactivated cellophane sheet was kept immersed in grafting solution maintained at 70° C. for 30 seconds in the environment of ultrasonic energy wave vibration. The film was then air dried and cured at 220° F. for 1–2 minutes.

The grafted cellophane sheet which was clear and transparent, showed significant increase in weight (18–21.62%) while the ungrafted film weight increase was minimal (insignificant).

EXAMPLE II

I. Preactivating Solution

Solution A—Wash with plain water at room temperature for one minute.

Solution B—Dip in 1.0% silver nitrate solution at room temperature for one minute.

Solution C—Rinse in water at room temperature for 10 seconds.

Solution D—Dip in 1% potassium hydroxide solution at 80° C. for one minute.

Solution E—Wash in plain water and dry in air.

| II. Grafting Solution: | |
| --- | --- |
| | Parts by Weight |
| Water | 100.00 |
| Dimethyl formamide | 20.00 |
| Acrylonitrile | 2.00 |

-continued

II. Grafting Solution:

| | Parts by Weight |
|---|---|
| 2-acrylamido-2-methyl propane sulfonic acid (AMPS) | 8.00 |
| Ammonium Persulfate | 1.00 |
| Sodium Metabisulfite | 1.00 |

The cellophane film, which was grafted in accordance with ultrasonic procedure given in Example I, was clear and transparent and indicated an increase in weight to 20.32%. However, non-activated cellophane film but treated with grafting solution followed by curing at 220° F. for 1–2 minutes, indicated an increase in weight to 0.01%.

EXAMPLE III

I. Preactivating Solution

Solution A—Wash with plain water at room temperature for one minute.

Solution B—Dip in 1.0% silver nitrate solution at room temperature for one minute.

Solution C—Rinse in water at room temperature for 10 seconds.

Solution D—Dip in 1% potassium hydroxide solution at 80° C. for one minute.

Solution E—Wash in plain water and dry in air.

II. Grafting Solution:

| | Parts by Weight |
|---|---|
| Water | 200.00 |
| Dimethyl formamide (DMF) | 40.00 |
| 2-acrylamido-2-methyl propane sulfonic acid (AMS) | 16.00 |
| Hydroxy ethyl metacrylate | 4.00 |
| Ammonium Persulfate | 2.00 |
| Sodium Metabisulfite | 2.00 |

The grafted cellophane sheet indicated an increase in weight to 20.42% while non-grafted film to 0.01–4.84%.

EXAMPLE IV

I. Preactivating Solution

Solution A—Wash with plain water at room temperature for one minute.

Solution B—Dip in 1.0% silver nitrate solution at room temperature for one minute.

Solution C—Rinse in water at room temperature for 10 seconds.

Solution D—Dip in 1% potassium hydroxide solution at 80° C. for one minute.

Solution E—Wash in plain water and dry in air.

II. Grafting Solution:

| | Parts by Weight |
|---|---|
| Water | 150.00 |
| Dimethyl formamide (DMF) | 30.00 |
| Sodium Styrene Sulfonate | 12.00 |
| Ammonium Persulfate | 1.50 |
| Sodium Metabisulfite | 1.50 |
| Glycidyl Methacrylate | 3.00 |

The grafted cellophane sheet showed an increase in weight to 21.62% while non-grafted indicated increase in weight to 0.25–3.75%.

Testing of grafted cellophane film, adhesion and percent add on—increase in weight

I. Adhesion

A piece of scotch tape (3M) was implanted firmly against grafted cellophane film and then pulled upward sharply. No visual delamination of the grafted polymer film was observed from the base material cellophane sheet. This indicated that grafting of polymerizable monomer to a polymer onto cellophane sheet was strongly bonded chemically.

II. Percent add on—increase in weight of grafted cellophane film

Table I summarizes the increase in weight of grafted and non-grafted cellophane film.

TABLE I

Percent add on (increase in weight) of grafted and non-grafted cellophane sheet:

| | | Increase in weight of non-grafted cellophane sheet | |
|---|---|---|---|
| Examples | Increase in weight of grafted cellophane film (%) | Preactivated film, treated with monomer solution and cured at 220° F. for 1–2 mts. | Nonactivated film, treated with grafting solution and cured at 220° F. for 1–2 mts. |
| I | 18.56 | 3.82 | 0.52 |
| II | 20.32 | 2.81 | 0.01 |
| III | 20.42 | 4.84 | 0.01 |
| IV | 21.62 | 3.75 | 0.25 |

In order to test the durability of increase in weight to grafted cellophane sheet, the grafted cellophane sheet obtained in each example was washed with deionized water for 1–2 minutes at room temperature, air dried and weighed again. The washings were also carried out in case of non-grafted cellophane sheet (control). The results are summarized in TABLE II.

TABLE II

Weight of grafted and non-grafted cellophane sheet after washings with water at room temperature.

| Examples | Weight after washings grafted cellophane sheet | Weight after washing non-grafted cellophane sheet | |
|---|---|---|---|
| | | Preactivated film treated with monomer solution and cured at 220° F. for 1–2 mts. | Nonactivated film treated with monomer solution and cured at 220° F. for 1–2 minutes. |
| I | 18.38 | 3.00 | 0.01 |
| II | 20.28 | 2.60 | 0.00 |
| III | 20.35 | 4.64 | 0.00 |
| IV | 21.54 | 3.68 | 0.02 |

As can be seen from the results in TABLE II, there is no significant loss in weight of grafted cellophane film after washings, thereby indicating that the attachment of polymer to the surface of cellophane sheet is permanent. However, in case of non-grafted cellophane sheet (control), there is a loss in weight after washings. This indicated that the attachment of polymer to non-grafted cellophane is physical rather than chemical.

The invention is applicable to the use of any polymerizable monomers such as: vinylidene chloride, chloroprene, isoprene, dimethylaminoethyl methacrylate, styrene, 1,3-butylene dimethyacrylate, hydroxyethyl methacrylate, isobutylvinyl ether, acrylonitrile, acrylamide, N-vinyl pyridine, glycidyl methacrylate; N-vinyl caprolactam, N-vinyl pyrrolidone, N-vinyl carbazole, acrylic acid, methacrylic acid, ethyl acrylate, ethyl methacrylate, itaconic acid, isobutylmethacrylate, methyl acrylate, sodium styrene sulfonate, sodium vinyl ether, divinylether of ethylene glycol, divinyl ether of butanediol, vinyl toluene, vinyl acetate, octadecyl vinyl ether. Also, mixtures of 2 or more monomers can be used. The monomeric tertiary amines can be quaternized with benzyl chloride, ethyl iodide, methyl or ethylsufate. Conversely, monomeric chlorides can be quaternized with tertiary amines to give quaternary ammonium compounds. Some suitable tertiary amines are: N-ethyl morpholine, pyridine, cetyldimethyl pyridine.

The monomer can be dissolved in a suitable solvent such as methylformamide, tetrahydrofuran, tetrahydrofurfuryl alcohol, dimethylsulfoxide, water, methyl, ethyl or isopropyl alcohol, acetone, methyl ethyl ketone and ethyl acetate. Also mixtures of two or more of the above can be used.

Among the catalysts which can be used are: ammonium persulfate, hydrogen peroxide, tert-butylhydroperoxide, ditert-butyl peroxide, benzoyl peroxide, dicumyl peroxide, lauryl peroxide, tert-butyl perbenzoate and peracetic acid.

A combination of two or more monomers mentioned above can be grafted to obtain graft copolymers.

The concentration of the silver nitrate in the initial silver nitrate solution can vary within wide ranges, though it is preferably between about 0.01% to 1% and most preferably between 0.05% to 0.1%.

The alkali metal hydroxide (potassium hydroxide) is most preferable, from the point of view of economy and ready availability. Other alkali metal hydroxides such as sodium hydroxide and lithium hydroxide can be used with equal facility. The concentration of the alkali metal hydroxide in the aqueous solution thereof, if an aqueous solution is used, can be within any range, though for practical convenience the range is generally between about 0.5% and 5% by weight.

The concentration of the monomer in the solution can likewise vary within practically any limits, for example between about 0.1% and 50% though the preferred concentration for facility of use is between about 5% and 15% by weight.

Among the materials that can be used for the non-metallic base object are: cellophane, cotton fibers and fabrics, rayon fibers and fabrics, wood, nylon fibers, fabrics and films, Dacron (which is polyester) fibers and fabrics, polyester fibers, fabrics and films, Mylar (which is polyethylene glycol adipate) films, Arnel (which is cellulose triacetate) fibers, fabrics and films, polyethylene fibers and fabrics, natural and synthetic rubbers, leather, wool and hair.

We claim:

1. In a method of grafting a polymer onto a non-metallic substrate which comprises activating the substrate by contacting the substrate with a solution of silver nitrate and precipitating silver oxide or colloidal silver therefrom by means of an alkali hydroxide, contacting the thus activated substrate with a polymerizable composition including a catalyst silver oxide or colloidal silver on the substance to bind the resulting polymer directly to the substrate, and curing the resulting polymer to effect intimate binding to the substrate, the improvement which comprises effecting grafting of polymers onto activated substrates using free radical polymerization induced by ultrasonic techniques.

2. The method of claim 1, wherein curing is effected by air drying the substrate followed by curing the substrate at about 220° F. for about 1–2 minutes.

3. The method of claim 1, wherein the substrate is cellophane, cotton, rayon, wood, nylon, polyester, polyethylene glycol adipate, cellulose triacetate, polyethylene, natural and synthetic rubbers, leather or wool.

4. The method according to claim 3, wherein grafting of polymers onto the substrate is accomplished using free radical polymerization induced by using ultrasonic techniques.

5. A method according to claim 1, wherein the substrate is cellophane.

6. A method according to claim 2 wherein the substrate is cellophane.

7. A method according to claim 4, wherein the substrate is cellophane.

* * * * *